Patented Sept. 2, 1947

2,426,693

UNITED STATES PATENT OFFICE 2,426,693

REDUCING CORROSIVE ACTION OF FRIEDEL-CRAFTS TYPE CATALYST

Wynkoop Kiersted, Jr., Scarsdale, N. Y., assignor to The Texas Company, New York, N. Y., a corporation of Delaware No Drawing. Application December 16, 1944, Serial No. 568,566

4 Claims. (Cl. 260—683.5)

This invention relates to the reduction of the corrosive action of Friedel-Crafts type catalysts and particularly catalysts of this type employed in the catalytic conversion of hydrocarbons.

The invention contemplates reducing the corrosive action of catalysts of the aluminum halide-hydrocarbon complex type employed in effecting hydrocarbon conversion reactions such as isomerization, alkylation and the like by treating the complex catalyst with a metal, preferably finely-divided metallic iron, such as iron turnings.

Aluminum halide catalysts in the form of a fluid aluminum halide-hydrocarbon complex containing, or not containing, unreacted solid aluminum halide suspended therein are useful catalysts for effecting isomerization of saturated petroleum hydrocarbons and also for effecting alkylation of isoparaffin hydrocarbons with olefin hydrocarbons.

These reactions are usually carried out by passing the hydrocarbons undergoing treatment in contact with a mass of the fluid complex catalyst maintained within a reaction vessel. It has been found, however, that the metal surfaces of reaction vessels and auxiliary equipment fabricated from ordinary iron and steel, upon exposure to contact with the catalyst under the reaction conditions usually prevailing, suffer substantial corrosion. The reason for this corrosive action and the nature of the substances in the catalyst responsible therefor are not understood. The corrosion action, however, is of such extent that frequent replacement of parts of the equipment is necessary or else resort must be had to the use of expensive alloy equipment or to the employment of other means, such as lining the equipment with ceramic or other materials.

I have discovered that these difficulties can be avoided by treating the complex catalyst so as to render it non-corrosive or substantially non-corrosive to ordinary steel such as boiler steel. For example, a sample of aluminum chloride-hydrocarbon complex catalyst used in isomerizing normal butane was placed in a beaker maintained at 210° F. A test specimen of boiler steel was suspended in the hot complex for a period of about five hours. Thereafter the test specimen was removed and inspected to determine the loss of metal. This loss of metal, calculated on the basis of inches penetration per year, was found to be about three inches.

Another sample of this same complex catalyst was subjected to contact with lathe turnings of iron, the contact being effected at a temperature of about 214° F. for a period of about 138 minutes. A test specimen was suspended in the treated complex under conditions similar to those employed in testing the untreated complex sample and the resulting corrosion rate was found to be equal to a penetration of about 0.12 inch per year.

The following data afford an approximate correlation between the reduction in corrosive action of the complex and the conditions of temperature and contact time used in treating the complex with iron lathe turnings, the turnings having previously been cleaned to remove any adhering foreign matter. The untreated complex exhibited a corrosive action equivalent to about 2.3 inches penetration per year on a specimen of boiler steel.

| Treating time, minutes | 30 | 60 | 138 |
|---|---|---|---|
| Maximum temperature °F | 165 | 190 | 211 |
| Inches penetration of test specimen | 1.80 | 0.24 | 0.13 |

The neutralizing treatment of the complex can be carried out by subjecting the complex and treating agent, such as iron turnings, to mixing in a vessel either in the presence or absence of hydrogen halide. The treatment may be carried out at a temperature ranging from 150 to 250° F. for a period of time ranging from 1 to 3 hours or more. Longer treating may be employed. For example, heating of a sample of complex for a period of 48 hours reduced the corrosive action, in terms of penetration of a test specimen, to 0.045 inch per year and the corrosiveness of this complex was not restored by bubbling HCl through it for a period of 16 hours.

On the other hand, the treatment may be effected by causing the complex catalyst to circulate through a treating tower or other auxiliary vessel containing a stationary mass of treating agent, the contact being effected at the proper temperature and for the necessary length of time to completely or substantally completely inhibit the corrosive action of the complex upon boiler steel. This latter method of treatment is advantageous in the usual commercial operations where the catalyst is maintained in continuous use and is fortified by the addition of fresh aluminum halide either periodically or continuously.

The complex catalyst used in isomerization of normal butane, for example, may be a preformed complex prepared by reacting anhydrous aluminum chloride with paraffinic hydrocarbons boiling in the range of gasoline and kerosene at temperatures of about 200 to 250° F. in the presence of hydrogen chloride under conditions to produce a complex characterized by having a heat of hydrolysis of about 300 to 330 small calories per gram of complex. In employing such a complex for the continuous isomerization of normal butane, it is customary to fortify the catalyst by the periodic or continuous addition of a small amount of aluminum chloride. This addition is usually accomplished by dissolving a small amount of aluminum chloride in the hydrocarbon feed stream passing to the reaction vessel, or by dissolving it in a separate stream of feed hydrocarbons passing to the reaction vessel. This fortification results in the formation of complex in situ during the course of the isomerization reaction as a result of interaction between added aluminum chloride and feed hydrocarbons. The aluminum chloride addition is regulated to maintain the catalyst body within the reaction zone characterized by having a heat of hydrolysis in the foregoing range or in any other predetermined range as may be desired.

The corrosive power of complex thus formed in situ may be neutralized by contact with a neutralizing agent. It is contemplated that the neutralizing agent may be continuously added to the reaction zone in finely divided condition or may be added periodically for the purpose of rendering non-corrosive the complex thus formed in situ, or to compensate for any loss of the neutralizing agent from the system, as for example by entrainment in the effluent hydrocarbon stream. On the other hand, this result may be accomplished by continuous withdrawal of a portion of the complex catalyst from the reaction zone and passage of the withdrawn fluid through the aforesaid treating tower, following which it is recycled to the hydrocarbon reaction zone.

The aforesaid preformed complex may be prepared in the presence of a mass of iron in discontinuous or divided form so that a subsequent or separate neutralizing operation is avoided.

Even though a complex may contain naturally occurring iron salts, such as ferric chloride, it has still been found to be corrosive so that the treatment with the neutralizing agent of this invention is essential.

While specific reference has been made to iron turnings, it is contemplated that iron or steel in some other discontinuous or disintegrated form may be used.

It is contemplated that the invention may be employed for the treatment of complex catalysts of the type in question which are used in other hydrocarbon conversion reactions than isomerization. The complex catalysts in question may be formed as a result of interaction between metallic halide and various types of hydrocarbons, including chlorinated hydrocarbons, and these complexes may be characterized by heats of hydrolysis ranging from 200 to 400 calories per gram of complex, depending upon the particular conversion reaction in which they are employed. Other Friedel-Crafts metallic halides may be used such as aluminum bromide. Also, other hydrogen halide promoters besides HCl may be used with these catalysts.

Obviously many modifications and variations of the invention as above set forth may be made without departing from the spirit and scope thereof, and therefore only such limitations should be imposed as are indicated in the appended claims.

I claim:

1. In the catalytic conversion of hydrocarbons at elevated temperature with a catalyst liquid comprising an aluminum halide-hydrocarbon complex liquid containing free aluminum halide in a reaction zone confined by a ferrous metal normally subject to substantial corrosion by the catalyst during the said conversion, the method of inhibiting said corrosion which comprises contacting said complex catalyst liquid in a separate treating zone with metallic iron in finely-divided form at an elevated temperature and for a time sufficient to render the catalyst liquid relatively non-corrosive to boiler steel at 210° F., removing said non-corrosive complex liquid catalyst from the said treating zone, and passing said non-corrosive complex liquid to the said reaction zone to serve as the catalyst therein.

2. In the continuous isomerization of hydrocarbons at an elevated temperature in the presence of a catalyst liquid comprising an aluminum chloride-hydrocarbon complex liquid containing free aluminum chloride and a hydrogen chloride promoter in a reaction zone confined by a ferrous metal normally subject to substantial corrosion by the catalyst liquid during the said isomerization, the method of substantially inhibiting said corrosion which comprises continuously withdrawing a portion of the complex catalyst liquid from said isomerization reaction zone, passing said withdrawn complex liquid to a treating zone and contacting the same therein with finely-divided metallic iron at an elevated temperature and for a time sufficient to render said complex liquid substantially non-corrosive to boiler steel at 210° F., removing the non-corrosive catalyst liquid from the said treating zone, and recycling removed non-corrosive catalyst liquid to the said isomerization reaction zone.

3. In the continuous isomerization of normal butane, wherein the normal butane feed is passed at an elevated temperature in contact with a body of aluminum chloride-paraffin hydrocarbon complex liquid catalyst containing free aluminum chloride in the presence of hydrogen chloride promoter in a reaction zone confined by a ferrous metal normally subject to substantial corrosion by the catalyst liquid during the said isomerization, and the complex liquid in the reaction zone is fortified by dissolving aluminum chloride in a stream of the normal butane feed passing to the reaction zone with the result that added free aluminum chloride forms with paraffin hydrocarbons additional complex liquid in situ in the reaction zone, the method of substantially inhibiting said corrosion which comprises continuously withdrawing a stream of the complex liquid catalyst from the reaction zone, treating the withdrawn stream with metallic iron in finely-divided form under conditions to render the complex liquid substantially non-corrosive to boiler steel at 210° F., and recycling non-corrosive complex liquid to the reaction zone.

4. In a catalytic hydrocarbon conversion process wherein hydrocarbons are converted in the presence of a catalyst consisting essentially of an active liquid aluminum chloride-paraffin hydrocarbon complex in the presence of hydrogen chloride in a conversion zone comprising a ferrous metal surface in direct contact with said catalyst and normally subject to substantial corrosion by said catalyst, the method of inhibiting any substantial corrosion of said ferrous metal surface which comprises pretreating said complex liquid by heating the said liquid in the presence of finely-divided metallic iron at a temperature of about 150–250° F. for a period of time ranging from about 1 to 48 hours, and then utilizing said pretreated complex liquid as the catalyst for said hydrocarbon conversion process.

WYNKOOP KIERSTED, Jr.

REFERENCES CITED

The following references are of record in the file of this patent:

UNITED STATES PATENTS

| Number | Name | Date |
|---|---|---|
| 1,944,170 | Darlington | Jan. 23, 1934 |
| 2,355,563 | Schulze | Aug. 8, 1944 |
| 2,344,466 | Laughlin | Mar. 14, 1944 |
| 2,217,019 | Ipatieff et al. | Oct. 8, 1940 |
| 2,382,753 | Treseder | Aug. 14, 1945 |
| 2,374,511 | Upham | Apr. 24, 1945 |